United States Patent
Ootsuka et al.

(10) Patent No.: US 7,657,687 B2
(45) Date of Patent: Feb. 2, 2010

(54) MEMORY CARD CONTROLLER, MEMORY CARD DRIVE DEVICE, AND COMPUTER PROGRAM

(75) Inventors: Takeshi Ootsuka, Hyogo (JP); Seigo Fujiwara, Osaka (JP)

(73) Assignee: Panasonic Corporation, Osaka (JP)

( * ) Notice: Subject to any disclaimer, the term of this patent is extended or adjusted under 35 U.S.C. 154(b) by 294 days.

(21) Appl. No.: 11/663,768

(22) PCT Filed: Sep. 29, 2005

(86) PCT No.: PCT/JP2005/018481

§ 371 (c)(1),
(2), (4) Date: Mar. 26, 2007

(87) PCT Pub. No.: WO2006/038663

PCT Pub. Date: Apr. 13, 2006

(65) Prior Publication Data

US 2007/0204077 A1 Aug. 30, 2007

(30) Foreign Application Priority Data

Oct. 1, 2004 (JP) .............................. 2004-289751

(51) Int. Cl.
*G06F 13/14* (2006.01)
*G06F 13/12* (2006.01)
*G06F 13/00* (2006.01)

(52) U.S. Cl. ........................... 710/305; 710/35; 710/59; 710/62; 714/25; 235/492; 361/737; 711/115; 711/167; 713/600; 713/601

(58) Field of Classification Search .................. 710/26, 710/59, 62; 714/25; 235/492; 361/737
See application file for complete search history.

(56) References Cited

U.S. PATENT DOCUMENTS 6,029,226 A * 2/2000 Ellis et al. ................... 711/100

(Continued)

FOREIGN PATENT DOCUMENTS

JP 9-330178 * 12/1997

(Continued)

OTHER PUBLICATIONS

Cogent Tech Corp. "SD Silicon Card Reader Module"—2 pages—No Date Provided.*

(Continued)

*Primary Examiner*—Mark Rinehart
*Assistant Examiner*—Brian T Misiura
(74) *Attorney, Agent, or Firm*—Wenderoth, Lind & Ponack, L.L.P.

(57) ABSTRACT

A memory card controller is provided with a clock start/end control unit that suspends supply of a clock signal to the memory card when a data amount transferred from the memory card as a result of the transfer operation reaches a data amount specified by an $n^{th}$ command received from the host device. The memory card controller resumes supply of the clock signal to the memory card if a subsequent command received with supply of the clock signal to the SD card in a suspended state specifies an address consecutive to an end address of data transfer requested by the nth command as a start address.

12 Claims, 8 Drawing Sheets

U.S. PATENT DOCUMENTS

| | | | |
|---|---|---|---|
| 6,198,876 B1 | 3/2001 | Iwasaki et al. | |
| 6,407,940 B1 * | 6/2002 | Aizawa | 365/52 |
| 6,427,184 B1 | 7/2002 | Kaneko et al. | |
| 6,678,755 B1 * | 1/2004 | Peterson et al. | 710/24 |
| 6,820,148 B1 * | 11/2004 | Cedar et al. | 710/104 |
| 6,958,757 B2 * | 10/2005 | Karlov | 345/557 |
| 7,046,519 B2 * | 5/2006 | Nakamura | 361/737 |
| 7,110,262 B2 * | 9/2006 | Matsumoto et al. | 361/737 |
| 7,238,051 B2 * | 7/2007 | Miyawaki et al. | 439/630 |
| 2002/0078297 A1 | 6/2002 | Toyama et al. | |
| 2003/0046599 A1 | 3/2003 | Takamiya et al. | |
| 2003/0188209 A1 * | 10/2003 | Nosaka | 713/320 |
| 2003/0236931 A1 | 12/2003 | Shinagawa | |
| 2004/0151040 A1 | 8/2004 | Minami | |
| 2006/0282634 A1 * | 12/2006 | Ohtsuka | 711/167 |
| 2007/0055821 A1 * | 3/2007 | Ootsuka et al. | 711/115 |
| 2007/0233907 A1 * | 10/2007 | Yoshikawa et al. | 710/26 |

FOREIGN PATENT DOCUMENTS

| | | | |
|---|---|---|---|
| JP | 11-53290 | * | 2/1999 |
| JP | 2003-36145 | | 2/2003 |
| JP | 2004-95036 | | 3/2004 |
| WO | 03/019841 | | 3/2003 |

OTHER PUBLICATIONS

International Search Report issued Dec. 2, 2008 in the International (PCT) Application of which the present application is the U.S. National Stage.

SD Association: "SdDCard Specification Simplified Version of Part E1. Secure Digital Input/Output (SDIO) Card Specification", Oct. 31, 2001.

* cited by examiner

MEMORY CARD CONTROLLER, MEMORY CARD DRIVE DEVICE, AND COMPUTER PROGRAM

BACKGROUND OF THE INVENTION

1. Technical Field

The present invention relates to a memory card drive device that controls data transfer between a host device and one or more memory cards, and particularly to improving technology for controlling mass data transfer.

2. Background Art

In the field of professional video devices, dealing with voluminous high-quality moving picture data is called for. In view of this, the use of memory card drive devices capable of accepting multiple memory cards has been suggested in the case where memory cards are used as the recording media with professional video devices. Japanese Patent Application Publication No. 2002-189992 recites conventional technology concerning the formation of memory card arrays by installing multiple memory cards.

The following description relates to a PC card type memory card drive device that employs SD memory cards (hereinafter "SD cards") as memory cards.

To use a PC card type memory card drive device, the memory card drive device is connected to a video device ("host device") via a card bus, and writing and reading of data (hereinafter, collectively referred to as "data transfer") is requested by the host device using ATA commands with the same procedures for accessing a normal PC card. Generally, controls using ATA commands indicate the head logical address from which to start data transfer and the number of sectors to be transferred.

On the other hand, the use of SD commands is required when instructing SD cards in relation to data transfer. With controls using SD commands, data transfer is executed continuously from the issuance of an SD command to start data transfer (hereinafter "transfer start command") until the issuance of an SD command to end data transfer (hereinafter "transfer end command").

This difference in the device interfaces requires the memory card drive device to control the operation of SD cards in the manner shown in FIG. 8.

FIG. 8 is a timing chart showing an exemplary operation by a PC card type memory card drive device to read data from a memory card. The host device issues ATA commands to the memory card drive device at timing A[1], A[2], A[3] and A[4] shown at level (a). In response, the memory card drive device, as shown at level (c), interprets the ATA commands and asserts transfer start commands and logical addresses from which to start the read operation to the SD card at timing S[1], S[2], S[3] and S[4].

On receiving a transfer start command, the SD card convert the head logical address to a physical address at the timing shown at level (e) (blackened portion), before reading data recorded in an internal non-volatile memory from the converted physical address and transferring the read data at the timing shown at level (f).

When data of an amount requested by an ATA command is transferred from an SD card, the memory card drive device issues a transfer end command to the SD card at the timing at level (c) (blackened portion) to terminate the read operation by the SD card, and issues a transfer end interrupt to the host device as shown at level (b). Synchronized data transfer between a host device and an SD card can thus be executed.

As a result of the memory card drive device controlling the operations of SD cards by issuing transfer start and end commands (SD commands) at a suitable timing whenever an ATA command requesting data transfer issues from the host device, data transfer can be executed with multiple SD cards installed in the memory card drive device viewed by the host device as a single PC card.

However, overheads are incurred that reduce the transfer rate in comparison to when data is read directly from an SD card, because of processing by the memory card drive device to convert ATA commands to SD commands and processing by the memory card to convert logical addresses to physical addresses being required whenever an ATA command is issued.

Incidentally, high-quality moving picture data can be anywhere from several hundred megabytes to several gigabytes in size. Essentially, with controls using SD commands, the memory card drive device when reading mass data written into a contiguous area of a memory card need only issue a transfer start command specifying the head address and a transfer end command when the end of the data is read.

However, with controls using ATA commands, the data transferable at any one time is restricted to a maximum of 64 Kbytes. Thus in reading mass data such as high-quality moving picture data from an SD card, the host device ends up repeatedly issuing hundreds if not thousands of ATA commands. Even if data transfer requested by a plurality of ATA commands relates to a contiguous area of a memory card, the memory card drive device, in order to synchronize the read operations of the host device and the memory card, is required to terminate the data transfer operation in the memory card every time 64 Kbytes of data is read.

As a result, the effect of overheads on the transfer rate when reading mass data are marked in comparison to when data is read directly from an SD card. Particularly in the case where multiple memory cards are arrayed and data reading is performed in parallel, the data length read from each memory card in response to a single ATA command is further reduced as the number of arrayed memory cards increases, exacerbating the effect of overheads on the transfer rate.

An object of the present invention is to provide a memory card controller, a memory card drive device and a computer program that are able, in the case where a host device uses commands with a short readable data length to instruct the reading of mass data, to suppress the effect of overheads on the read transfer rate while at the same time synchronizing the host device and one or more memory cards.

SUMMARY OF THE INVENTION

To achieve the above object, a memory card controller pertaining to the present invention controls data transfer between a host device that requests data transfer by issuing a command specifying a data amount and a memory card that executes a transfer operation from receipt of a transfer start instruction until receipt of a transfer end instruction. The memory card controller includes a receiving unit operable to sequentially receive commands from the host device; a suspending unit operable to have the memory card suspend the transfer operation when a data amount transferred as a result of the transfer operation reaches a data amount specified by an $n^{th}$ command that requests the data transfer; and a resuming unit operable to have the memory card resume the suspended transfer operation if a command received subsequent to the $n^{th}$ command when the transfer operation is in a suspended state requests data transfer with respect to an address consecutive to an end address of the data transfer requested by the $n^{th}$ command.

According to this structure, a memory card controller pertaining to the present invention is able to reduce the amount of processing that represents overheads, such as the conversion of commands by a memory card controller and the conversion of addresses by a memory card, since the issuance of a transfer start instruction is not required every time a command is received in the case where commands requesting data transfer with respect to a contiguous area of the memory card continually issue from a host device. On the other hand, the fact that data transfer by the memory card is suspended from the completion of data transfer in response to one command until the issuance of a subsequent command by the host device means that synchronization of data transfer between the host device and the memory card is not lost.

In other words, the effect of processing that represents overheads on the transfer rate can be suppressed, while at the same time synchronizing the host device and the memory card.

Here, the data transfer may be data reading from the memory card, and the transfer operation by the memory card may be a data read operation.

This structure enables the effect of overheads on the transfer rate to be suppressed, since the number of transfer start instructions issued to a memory card when reading data from the memory card can be reduced, while at the same time synchronizing the host device and the memory card.

Here, the suspension and the resumption of the data read operation may be controlled by respectively suspending and resuming supply of a clock signal to the memory card.

This structure allows the read operation by a memory card to be suspended and resumed quickly. The adverse effect on the transfer rate of processing to suspend and resume the read operation can thus be suppressed.

Here, the memory card controller may further includes an instruction issuing unit operable to control starting and ending of the data read operation by respectively issuing the transfer start instruction and the transfer end instruction to the memory card. If a predetermined time period elapses with the data read operation in the suspended state, the resuming unit may have the memory card cancel the suspended state by resuming supply of the clock signal, and the instruction issuing unit may have the memory card terminate the data read operation by issuing the transfer end instruction.

It is assumed that commands will issue frequently from a host device when reading mass data recorded in a contiguous area of a memory card. This being the case, it is presumed if a situation arises in which a command has not issued from the host device for a predetermined time period or longer that the reading of mass data has been completed, and so the memory card controller has the memory card terminate the suspended read operation. Commands issued subsequently, which are unlikely to have continuity with the $n^{th}$ command, can be processed promptly given that the read operation has been terminated. Memory card operation is also stabilized since the read operation is not suspended for longer than a predetermined time period.

Here, the suspending unit may maintain the suspended state of the data read operation if the subsequent command does not require access to the memory card.

This structure enables the number of transfer start instructions issued to the memory card to be reduced if the next command after that requests data transfer with respect to an address that is contiguous to the end address of data transfer performed in response to the $n^{th}$ command, thus enabling the effect of overheads on the transfer rate to be suppressed.

Here, the memory card controller may further include an instruction issuing unit operable to control starting and ending of the data read operation by respectively issuing the transfer start instruction and the transfer end instruction to the memory card. If the subsequent command requests one of data writing and data reading to read data from an address that is not consecutive to the end address of the data reading requested by the $n^{th}$ command, the resuming unit may have the memory card cancel the suspended state of the data read operation by resuming supply of the clock signal, and the instruction issuing unit may issue the transfer start instruction in response to the subsequent command after having the memory card terminate the data read operation by issuing the transfer end instruction.

This structure prevents any great reduction in the transfer rate by only issuing a transfer end instruction even in the case where a command requesting data transfer with respect to an address consecutive to the end address of data transfer performed in response to the $n^{th}$ command is not subsequently issued.

Here, the data transfer may be data writing to the memory card, and the transfer operation by the memory card may be a data write operation.

This structure enables the number of transfer start instructions issued to a memory card when writing data to the memory card to be reduced while at the same time synchronizing the host device and the memory card, thus enabling the effect of overheads on the write transfer rate to be suppressed.

Here, the suspension and the resumption of the data write operation may be controlled by respectively suspending and resuming supply of write data to the memory card.

This structure allows the write operation by a memory card to be suspended and resumed quickly. The adverse effect on the transfer rate of processing to suspend and resume the write operation can thus be suppressed.

Here, the memory card controller may further include an instruction issuing unit operable to have the memory card terminate the data write operation by issuing the transfer end instruction if a predetermined time period elapses with the data write operation in the suspended state.

It is assumed that commands will issue frequently from a host device when writing mass data to a contiguous area of a memory card. This being the case, it is presumed if a situation arises in which a command has not issued from the host device for a predetermined time period or longer that the writing of mass data has been completed, and so the memory card controller has the memory card terminate the suspended write operation. Commands issued subsequently, which are unlikely to have continuity with the $n^{th}$ command, can be processed promptly given that the write operation has been terminated. Memory card operation is also stabilized since the write operation is not suspended for longer than a predetermined time period.

Here, the suspending unit may maintain the suspended state of the data write operation if the subsequent command does not require access to the memory card.

This structure enables the number of transfer start instructions issued to the memory card to be reduced if the next command after that requests data transfer with respect to an address that is contiguous to the end address of data transfer performed in response to the $n^{th}$ command, thus enabling the effect of overheads on the transfer rate to be suppressed.

Here, the memory card controller may further include an instruction issuing unit operable to issue the transfer start instruction to the memory card in response to the subsequent command after having the memory card terminate the data write operation by issuing the transfer end instruction, if the subsequent command requests one of data reading and data writing to write data to an address that is not consecutive to the end address of the data writing requested by the $n^{th}$ command.

This structure prevents any great reduction in the transfer rate by only issuing a transfer end instruction even in the case where a command requesting data transfer with respect to an address consecutive to the end address of data transfer performed in response to the $n^{th}$ command is not subsequently issued.

In order to achieve the above object, a memory card drive device pertaining to the present invention includes a memory card controller as described above, a first interface operable to be connected to a host device, and a second interface operable to accept one or more memory cards. Here, the memory card controller accesses the one or more memory cards installed in the second interface, based on a command inputted from the first interface.

According to this structure, a memory card drive device pertaining to the present invention is able to reduce the amount of processing that represents overheads, such as the conversion of commands by a memory card controller and the conversion of addresses by a memory card, since the issuance of a transfer start instruction is not required every time a command is received in the case where commands requesting data transfer with respect to a contiguous area of the memory card continually issue from a host device. On the other hand, the fact that data transfer by the memory card is suspended from the completion of data transfer in response to one command until the issuance of a subsequent command by the host device means that synchronization of data transfer between the host device and the memory card is not lost.

In other words, the effect of processing that represents overheads on the transfer rate can be suppressed, while at the same time synchronizing the host device and the memory card.

In order to achieve the above object, a computer program pertaining to the present invention is for a memory card controller that controls data transfer between a host device which requests data transfer by issuing a command specifying a data amount and a memory card which executes a transfer operation from receipt of a transfer start instruction until receipt of a transfer end instruction. The computer program controls a processor of the memory card controller to execute the steps of having the memory card suspend the transfer operation when a data amount transferred as a result of the transfer operation reaches a data amount specified by an $n^{th}$ command that requests the data transfer, and having the memory card resume the suspended transfer operation if a command received subsequent to the $n^{th}$ command when the transfer operation is in a suspended state requests data transfer with respect to an address consecutive to an end address of the data transfer requested by the $n^{th}$ command.

According to this structure, a computer program pertaining to the present invention able to realize controls to reduce the amount of processing that represents overheads, such as the conversion of commands by a memory card controller and the conversion of addresses by a memory card, in the case where commands requesting data transfer with respect to a contiguous area of the memory card continually issue from a host device. On the other hand, the fact that the computer program realizes controls to suspend data transfer by the memory card from the completion of data transfer in response to one command until the issuance of a subsequent command by the host device means that synchronization of data transfer between the host device and the memory card is not lost.

In other words, the effect of processing that represents overheads on the transfer rate can be suppressed, while at the same time synchronizing the host device and the memory card.

DETAILED DESCRIPTION OF INVENTION

Figure 1:
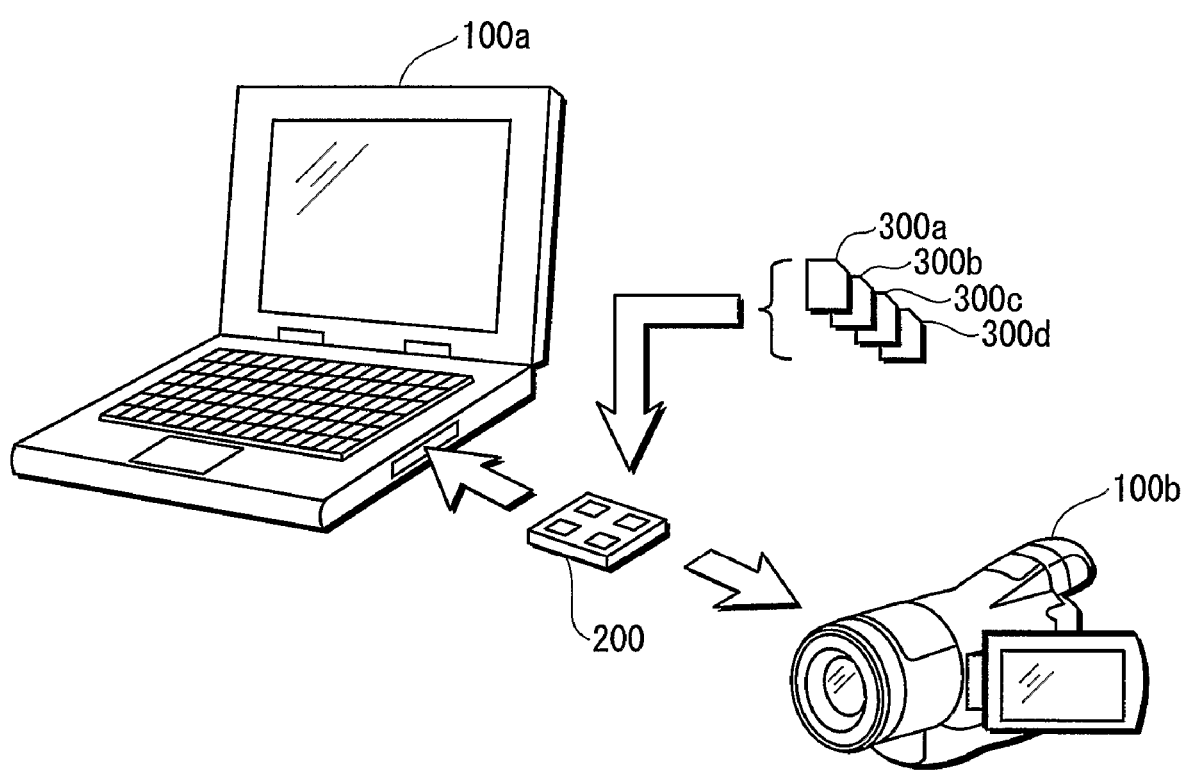
FIG. 1 shows a video/playback system that uses a memory card drive device pertaining to the present invention.

An embodiment of a memory card drive device pertaining to the present invention is described below. Firstly, a video/playback system that uses the memory card drive device pertaining to the present invention is described to begin with. FIG. 1 shows a video/playback system that uses the memory card drive device pertaining to the present invention. The video/playback system shown in FIG. 1 records video and audio shot at a video and audio quality equivalent to digital video tape onto a memory card as moving picture data, and plays the recorded moving picture data.

A video device such as a personal computer or a video camera with a PCMCIA card slot may be used as a host device that functions to video and display moving picture data. SD cards are used as memory cards.

In FIG. 1, the memory card drive device pertaining to the present invention is a memory card drive 200. Memory card drive 200 is provided with four SD slots capable of accepting SD cards. Memory card drive 200 with SD cards 300a to 300d installed therein is inserted for use in the PCMCIA card slot of a host device 100a or a host device 100b.

Figure 2:
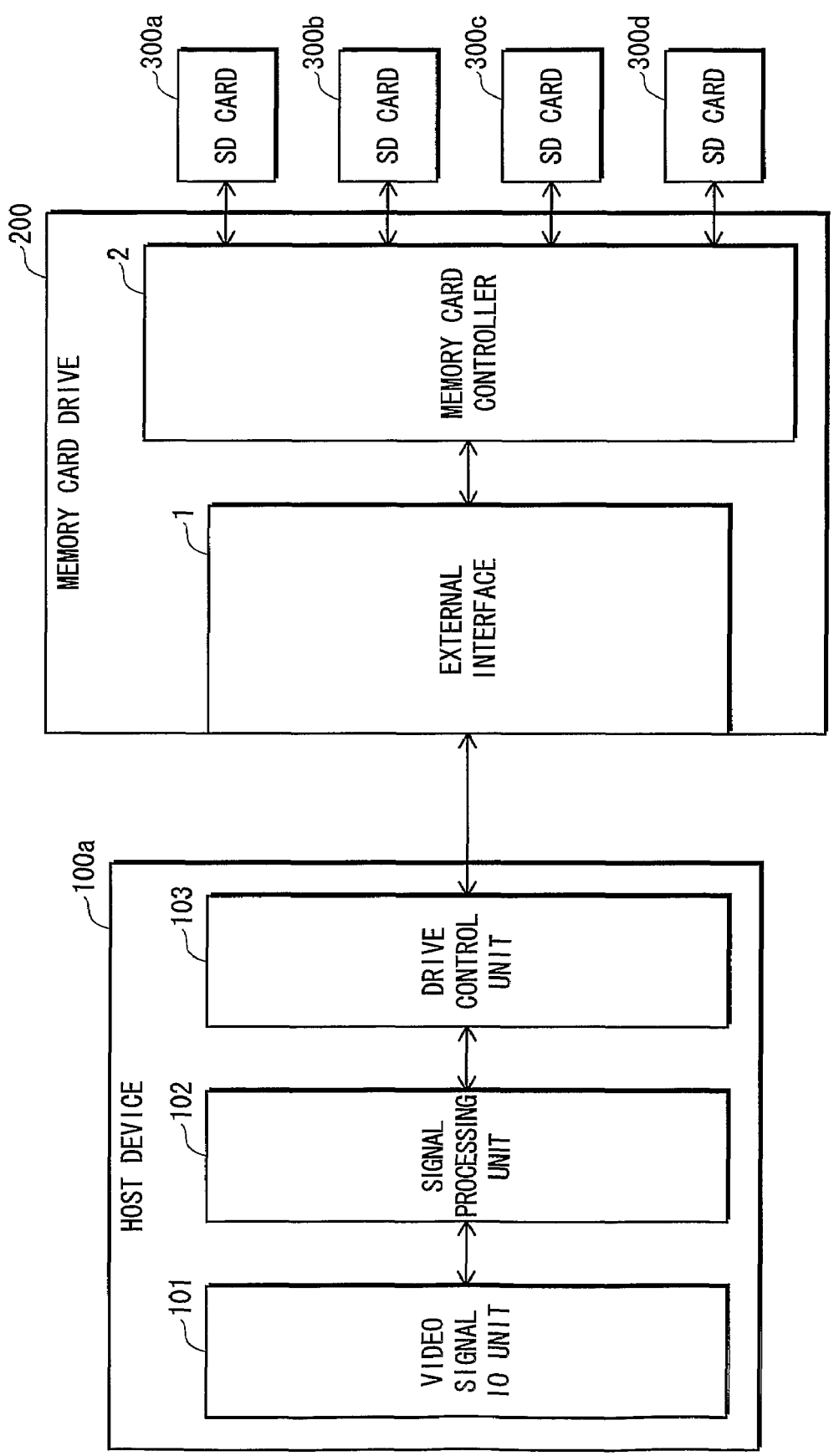
FIG. 2 shows an internal structure of devices constituting the video/playback system pertaining to the present invention.

FIG. 2 shows an internal structure relating to data transfer of the devices constituting the video/playback system pertaining to the present invention. Host device 100a is provided with a video signal input/output (IO) unit 101, a signal processing unit 102, and a drive control unit 103. These constituent components are used to request memory card drive 200 to perform data transfer, such as the writing and reading of moving picture data. While the internal structure of host device 100a is shown here, host device 100b is also provided with the same structure.

Video signal IO unit 101 controls the input of video signals to and the output of video signals from a camera module and a display module included in the host device in response to operational states such as recording and playback. Signal processing unit 102 is a codec that functions to encode video signals input from video signal IO unit 101 to generate moving picture data, and to decode moving picture data read from an SD card to generate video signals. Drive control unit 103 functions to control memory card drive 200 by issuing ATA commands, and transmits data to and receives data from an external interface 1 of memory card drive 200 using card bus standards. Generally, an ATA command requesting data transfer includes a command portion specifying an operation such as write or read, the logical address of the head sector targeted for data transfer, and the number of sectors to be transferred. Here, host devices 100a and 100b recognize the four SD cards arrayed in memory card drive 200 as a single virtual drive, and issue ATA commands after using the logical address on the virtual drive to determine the logical address of the head sector targeted for data transfer and the number of sectors to be transferred. The sectors referred to here are in one-to-one correspondence with recording blocks on the SD cards. ATA commands were originally designed for disk media, which is the reason why host devices 100a and 100b use sectors to specify data transfer destinations and the like.

Memory card drive 200 is provided with external interface 1 and a memory card controller 2.

External interface 1 functions to transmit data to and receive data from drive control unit 103 in the host device using card bus standards.

Memory card controller 2 functions to control the operations of SD cards 300a to 300d installed in the SD slot in response to ATA commands received from the host device. SD commands are used in the controls on SD cards 300a to 300d by memory card controller 2. To start data transfer, memory card controller 2 converts the logical address shown by the ATA command to a logical address in the SD cards, and issues an SD command to the SD cards indicating to start data transfer (e.g. writing or reading) together with the converted logical address. If the SD command indicates to start writing, write data is then transferred sequentially to the SD cards. To end data transfer, memory card controller 2 issues a STOP command to the SD cards indicating to end data transfer, and asserts a transfer end interrupt to the host device showing completion of data transfer.

Memory card controller 2 functions to control supply of a clock signal to the SD cards. Memory card controller 2 is able to interrupt the operations of the SD cards by suspending supply of the clock signal, and to have the SD cards resume the interrupted operations by resuming supply of the clock signal.

Memory card controller 2 transfers data with a bandwidth of 25 Mbps by striping the data across SD cards 300a to 300d operated in parallel. Here, "striping" refers to the writing of data divided into recording blocks in parallel to a plurality of memory cards. Since four SD cards are arrayed in the present embodiment, the data to be written is divided in four.

Specifically, memory card controller 2 manages SD cards 300a to 300d by assigning card numbers 0 to 3. When data is written, memory card controller 2 uses the remainder of dividing the sector number of each sector to be written by four as a write card number, and has data written to the SD card which is managed using that write card number. When data is read, memory card controller 2 uses the remainder of dividing the sector number of each sector from which data is to be read by four as a read card number, and has data read from the SD card which is managed using that read card number. As a result of striping, SD cards 300a to 300d constitute a single virtual drive. Data transfer efficiency increases with striping if the number of sectors to be transferred is greater than or equal to the number of arrayed memory cards.

SD cards 300a to 300d, which are memory cards with built-in rewritable non-volatile memory, record and playback data with respect to the non-volatile memory in sync with a clock signal. The operations of SD cards 300a to 300d are controlled by SD commands issued from memory card drive 200.

When a write start command issues from memory card controller 2, SD cards 300a to 300d read a correlation table showing the correspondence between logical and physical addresses in the non-volatile memory, convert the logical address asserted together with the SD command to a physical address, and write data transferred via memory card controller 2 starting from the converted physical address. When a STOP command issues from memory card controller 2 during the write operation, SD cards 300a to 300d terminate the data write operation and update the correlation table according to the result of the writing.

When a read start command issues from memory card controller 2, SD cards 300a to 300d read the correlation table showing the correspondence between logical and physical addresses in the non-volatile memory, convert the logical address asserted together with the SD command to a physical address, read data recorded in the non-volatile memory starting from the converted physical address, and transfers the read data to memory card controller 2. When a STOP command issues from memory card controller 2 during the read operation, SD cards 300a to 300d terminate the data read operation. This completes description of a video/playback system that uses the memory card controller pertaining to the present invention.

Figure 3:
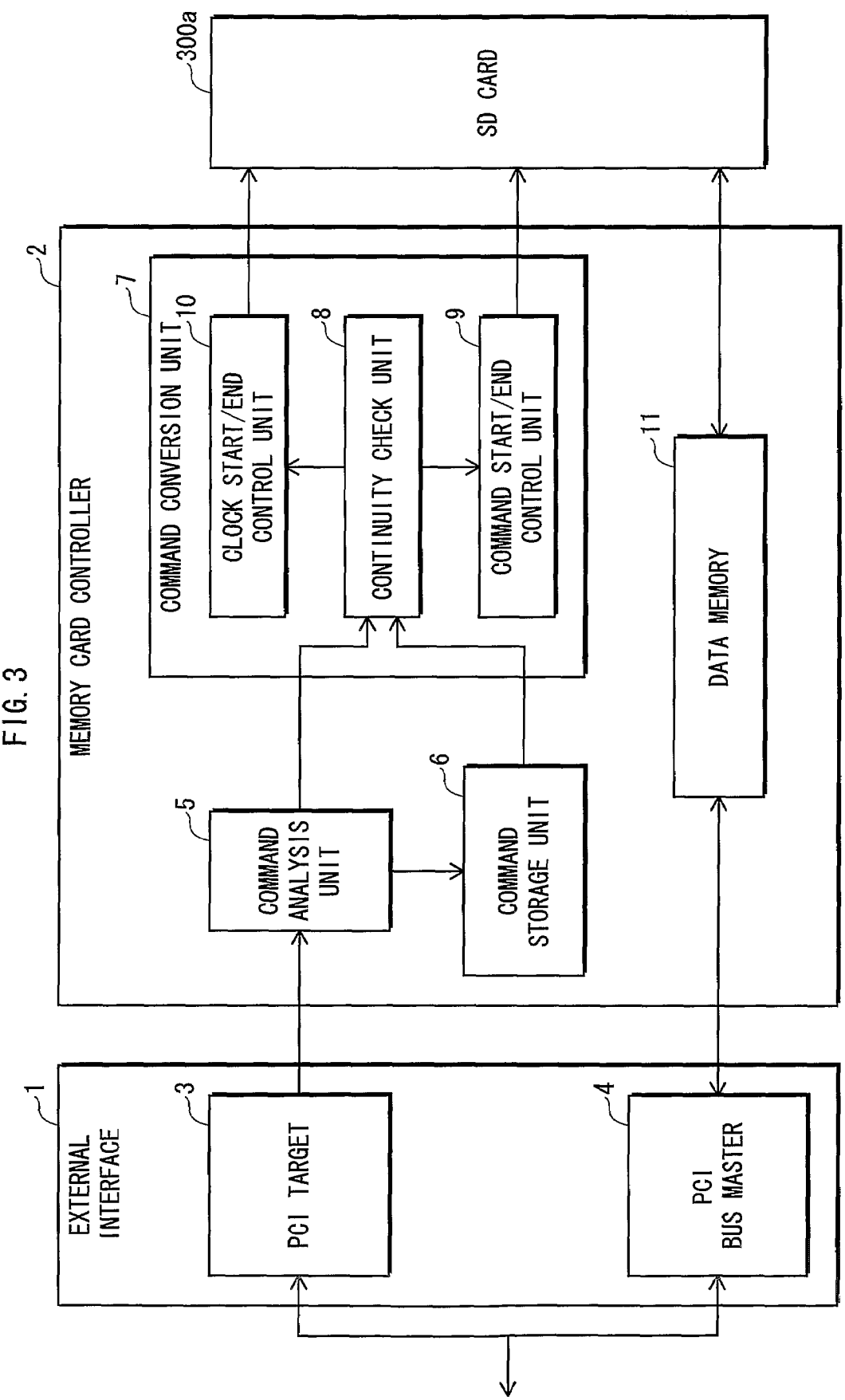
FIG. 3 shows a detailed structure of a memory card drive 200.

A description of the detailed internal structure of memory card drive 200 pertaining to the present invention is given next. FIG. 3 shows a detailed structure of memory card drive 200.

External interface 1 is provided internally with a PCI target 3 and a PCI bus master 4. PCI target 3 is responsible for transmitting ATA commands to and receiving ATA commands from host devices 100a and 100b. PCI bus master 4 uses direct memory access (DMA) transfer to transmit data to and receive data from host devices 100a and 100b. Here, DMA transfer is used in order to obtain a high transfer rate, although other transfer techniques may also be used to transmit and receive data.

Memory card controller 2 is provided with a command analysis unit 5, a command storage unit 6, a command conversion unit 7, and a data memory 11.

Command analysis unit 5 analyzes ATA commands received by PCI target 3, and separates the logical address of the head sector and the number of sectors to be transferred from the command. Command storage unit 6 stores and temporarily holds previously received ATA commands. Data memory 11 is a buffer memory between PCI bus master 4 and the SD cards.

Command conversion unit 7 is provided internally with a continuity check unit 8, a command start/end control unit 9, and a clock start/end control unit 10. Command conversion unit 7 controls the operations of SD card 300a by controlling both the issue of SD commands corresponding to ATA commands analyzed by command analysis unit 5 and the clock supply to the SD card. Note that while only the structure pertaining to the interface with SD card 300a is depicted in FIG. 3 so as to avoid complicating the figure, a structure similar to command conversion unit 7 is provided in memory card controller 2 for each of SD cards 300a to 300d. It is these units that realize the striping controls.

Continuity check unit 8 judges whether subsequently issued ATA commands request data reading with respect to consecutive sectors, and has command start/end control unit 9 and clock start/end control unit 10 execute processing to control the operations of SD card 300a depending on the judgment result.

Command start/end control unit 9 has SD card 300a start and terminate the write or read operation by issuing an SD command according to the type of ATA command.

Clock start/end control unit 10 has SD card 300a suspend or resume the read operation by respectively suspending or resuming supply of a clock signal to SD card 300a during the read operation. Here, clock start/end control unit 10 suspends supply of the clock signal from when data requested by the preceding ATA command has been read until receipt of the subsequent command. This completes description of the detailed internal structure of memory card drive 200 pertaining to the present invention.

Figure 4:
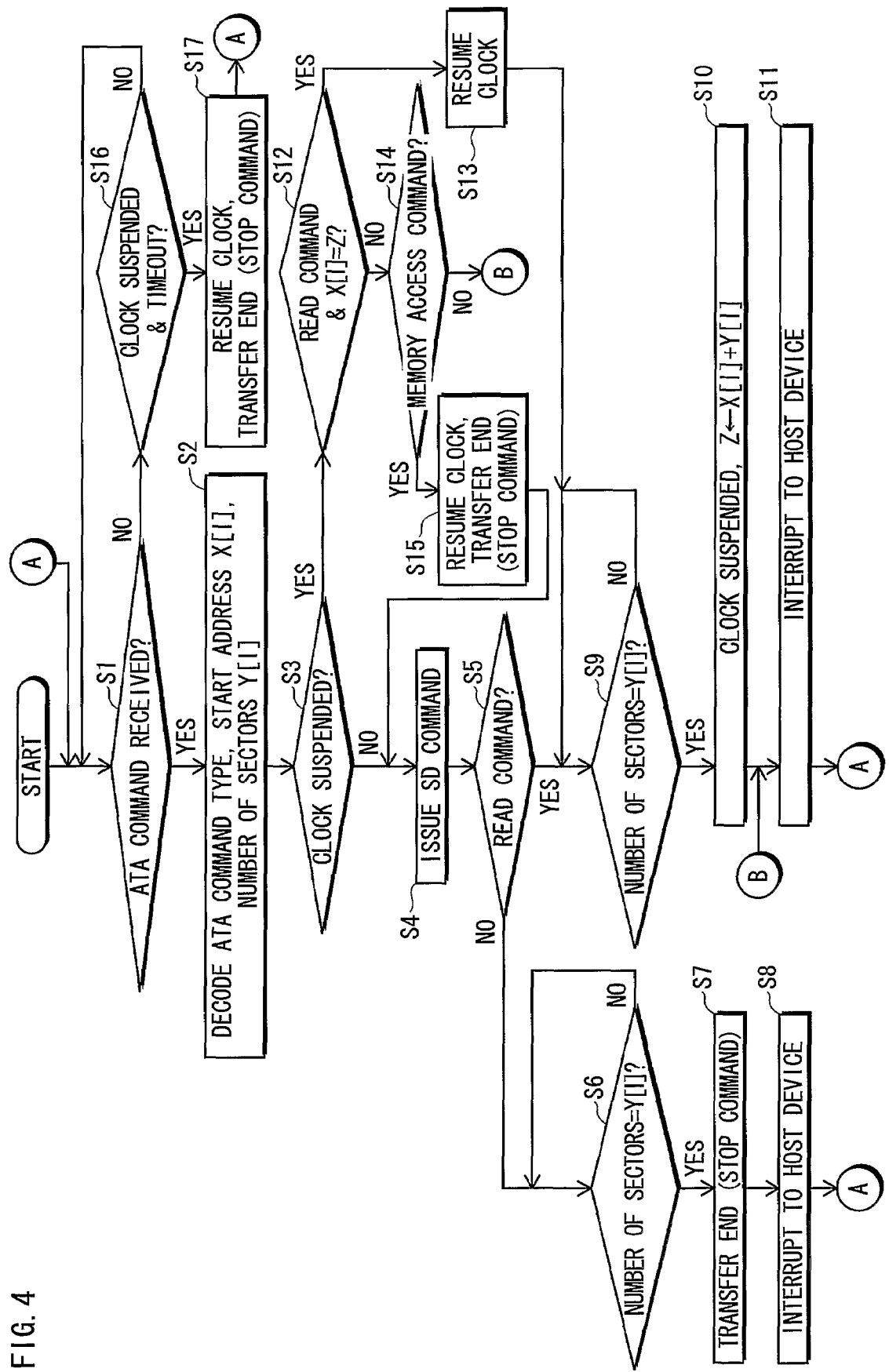
FIG. 4 is a flowchart showing a processing procedure by a memory card controller pertaining to the present embodiment.

The following is a description of the detailed processing by memory card controller 2 mentioned above, with reference to FIG. 4. FIG. 4 is a flowchart showing the processing procedure by memory card controller 2.

After power ON, memory card controller 2 waits in a loop consisting of steps S1 and S16 for PCI target 3 to receive an ATA command, and executes the processing from step S2 onward once an ATA command is received (step S1=YES).

At step S2, command analysis unit 5 analyzes the received ATA command, and acquires the logical address of the head sector targeted for data transfer and the number of sectors to be transferred. Hereinafter, X[I] is used to denote the transfer destination logical address acquired from the analysis of the $I^{th}$ (I being a natural number) ATA command received after power ON, and Y[I] is used to denote the number of sectors to be transferred.

At step S3, continuity check unit 8 judges whether a clock signal is being supplied to the SD card.

If judged at step S3 that a clock signal is being supplied to the SD card (step S3=NO), command start/end control unit 9 issues an SD command to the SD card indicating to start writing or reading from the logical address X[I], depending on the request by the ATA command (step S4).

If the SD command issued at step S4 is a write start command (step S5=NO), the SD card starts the write operation in response to the command, and memory card controller 2 controls the write operation in the SD card through steps S6 to S8.

At steps S6 to S8, command start/end control unit 9 monitors the amount of data supplied to the SD card during the write operation, and when the supplied data amount reaches the number of sectors Y[I] obtained from the ATA command (step S6=YES), command start/end control unit 9 issues an SD command to the SD card to stop the write operation (step S7). Once the SD card has terminated the write operation in response to the STOP command and updated the correlation table showing the correspondence between logical and physical addresses, memory card controller 2 asserts an interrupt to the host device showing completion of command execution (step S8). After the execution of steps S6 to S8, processing returns to the loop of steps S1 and S16.

If the SD command issued at step S4 is a read start command (step S5=YES), the SD card starts the read operation in response to the command, and memory card controller 2 controls the read operation in the SD card through steps S9 to S11.

At steps S9 to S11, clock start/end control unit 10 monitors the amount of data read and transferred from the SD card during the read operation, and when the read amount of data reaches the number of sectors Y[I] obtained from the ATA command (step S9=YES), clock start/end control unit 10 stops supply of the clock signal to the SD card, sums the logical address X[I] of the transfer destination and the number of sectors Y[I], and records the calculated value to command storage unit 6 as a consecutive start address Z (step S10). Here, the value of the consecutive start address Z is held in command storage unit 6 until the step S10 processing is next executed and a new value is notified. Note that the processing to record the consecutive start address Z to command storage unit 6 may be executed during the read operation by the SD card; that is, before the read amount of data reaches the number of sectors Y[I]. This enables the calculation and recording of the consecutive start address Z to be performed without affecting the transfer rate.

Once supply of the clock signal has been suspended and the SD card has suspended execution of the read operation, memory card controller 2 asserts an interrupt to the host device showing completion of command execution (step S11). After the execution of steps S6 to S8, processing returns to the loop of steps S1 and S16.

If a new ATA command is received after the execution of steps S6 to S8 (step S1=YES), steps S12 to S15 are executed after the step S3 judgment given that supply of the clock signal to the SD card was suspended at step S10.

At step S12, in order to judge whether the new ATA command received as part of the current processing is a read command requesting data that would be read if the suspended read operation in the SD card was resumed, continuity check unit 8 judges whether both of the following conditions (1) and (2) are satisfied.

(1) The new ATA command received as part of the current ATA command processing requests a read operation.

(2) The consecutive start address Z recorded to command storage unit 6 when step S10 was executed in processing a previous ATA command matches the logical address X[I] of the transfer destination acquired at step S2 based on the new ATA command received as part of the current processing.

If notified by continuity check unit 8 that both of the above conditions (1) and (2) are satisfied (step S12=YES), clock start/end control unit 10 resumes supply of the clock signal to the SD card (step S13). The read operation suspended in the SD card is resumed once supply of the clock signal is resumed. In response, memory card controller 2 controls the read operation in the SD card through steps S9 to S11.

If one or both of the above conditions (1) and (2) is not satisfied (step S12=NO), that is, if the new ATA command received as part of the current processing is not a read command requesting data that would be read if the suspended read operation in the SD card was resumed, continuity check unit 8 judges whether the following condition (3) is satisfied (step S14).

(3) The ATA command received as part of the current processing requires memory access to the SD card.

If notified by continuity check unit 8 that the above condition (3) is satisfied (step S14=YES), clock start/end control unit 10 resumes supply of the clock signal to the SD card, and command start/end control unit 9 issues an SD command to the SD card to stop the read operation (step S15). Once the SD card has terminated the suspended read operation in response to the execution of step S15, memory card controller 2 executes processing in order from step S4.

If the above condition (3) is not satisfied (step S14=NO), memory card controller 2 firstly executes the processing requested by the ATA command (i.e. processing not resulting in memory access to the SD card) without resuming supply of the clock signal to the SD card, and then at step S11 asserts an interrupt to the host device showing completion of command execution, before waiting in the loop of steps S1 and S16 for the next ATA command.

Note that, specifically, ATA commands that do not require memory access to the SD card include commands such as an IDENTIFY DEVICE command.

In the above processing flow, processing moves to the loop of steps S1 and S16 after the interrupt showing completion of command execution has been asserted to the host device at step S11, with supply of the clock signal to the SD card in a suspended state. If the next ATA command is not received within a predetermined time period (e.g. 1 sec) with supply of the clock signal in the suspended state (step S16=YES), the suspended read operation in the SD card is terminated by clock start/end control unit 10 resuming supply of the clock signal to the SD card and command start/end control unit 9 issuing an SD command to the SD card to stop the read operation (step S17).

This completes description of the detailed processing performed in memory card controller 2. The above processing procedure by memory card controller 2 can be realized by implementing dedicated hardware or by having a microprocessor execute the processing procedure described in a descriptive computer language.

Figure 5:
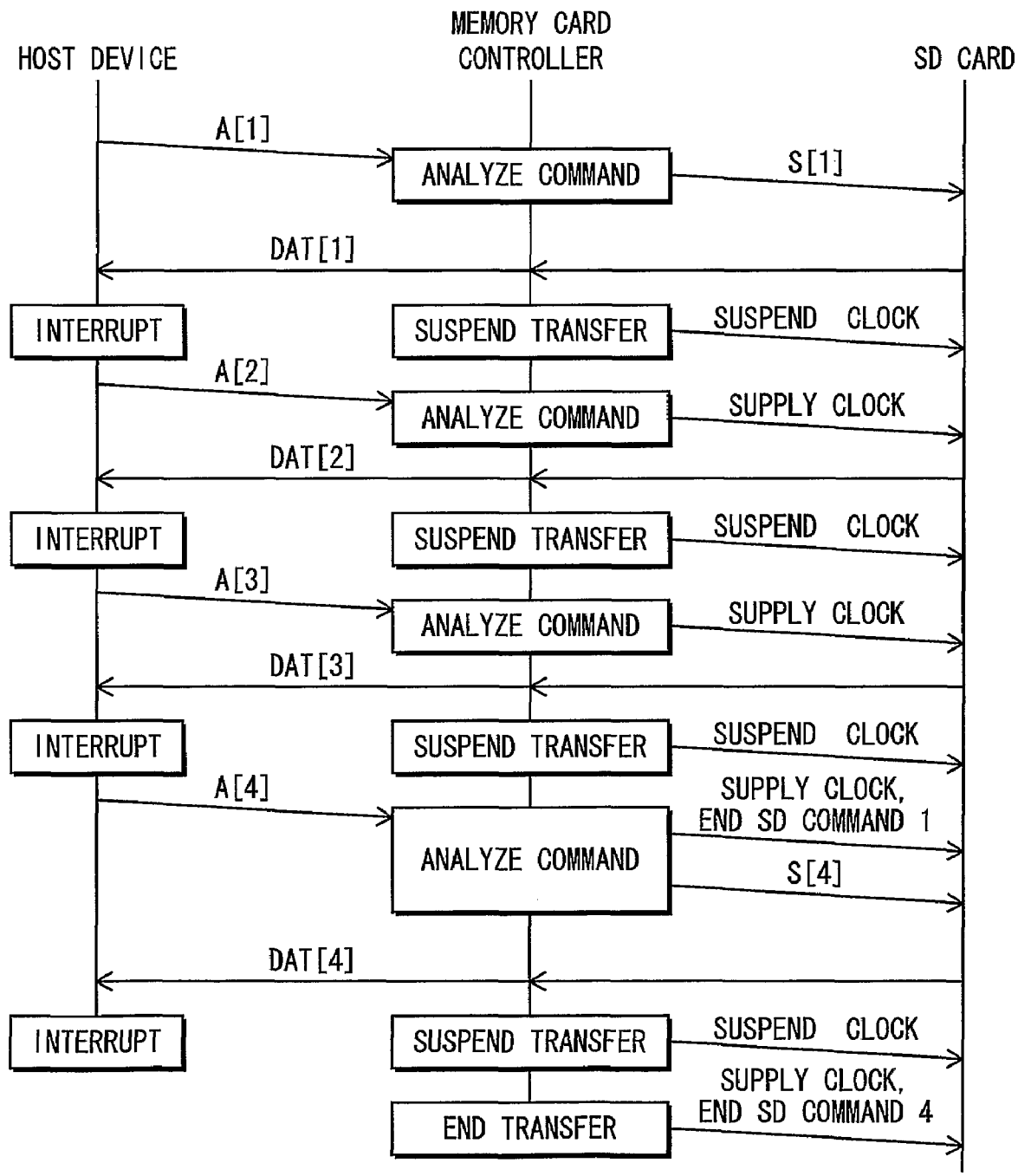
FIG. 5 shows a processing sequence of memory card drive 200.

An example of the operations of memory card drive 200 constituted as described above is given next with reference to FIGS. 5 and 6. FIG. 5 shows a processing sequence of memory card drive 200, while FIG. 6 is a timing chart showing a detailed read operation.

Figure 6:
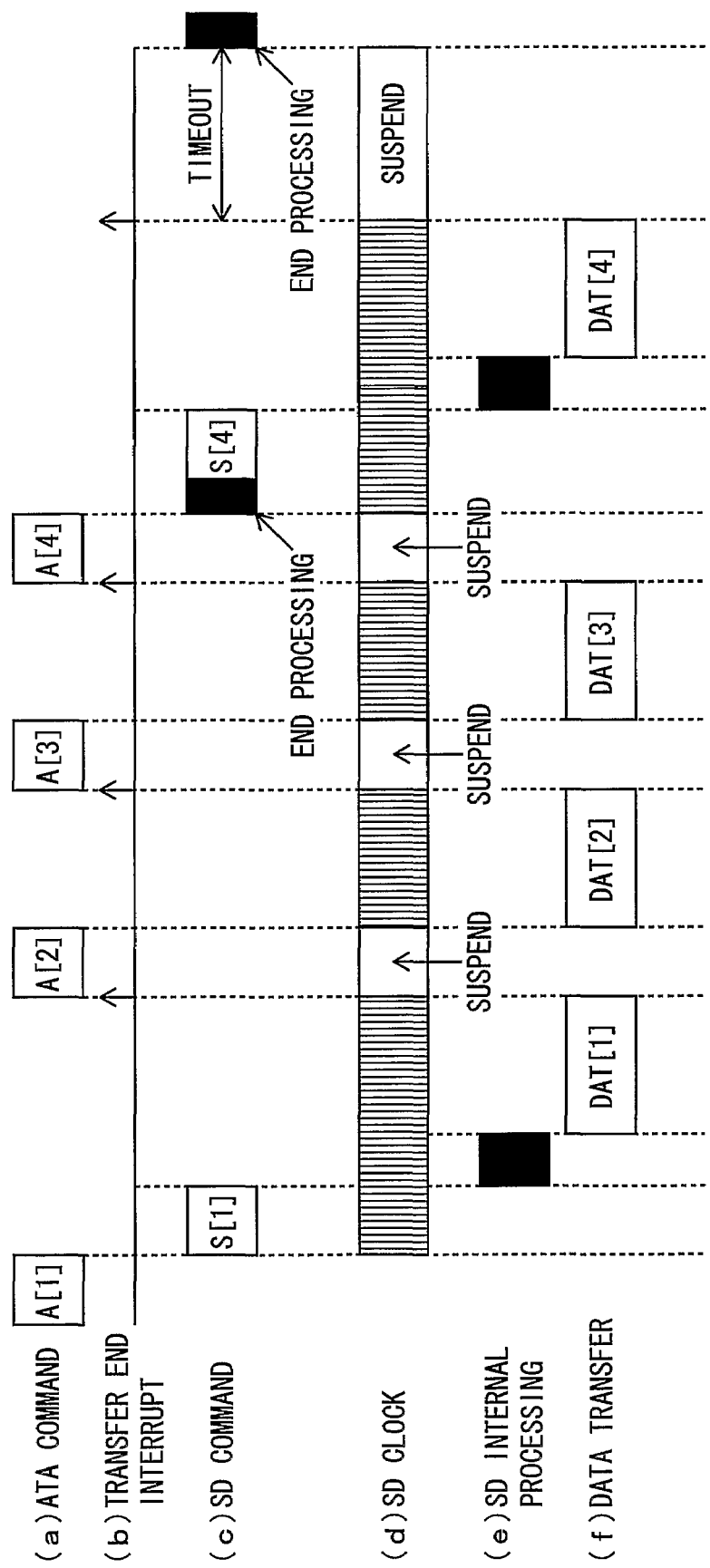
FIG. 6 is a timing chart showing an exemplary read operation by a memory card controller pertaining to the present embodiment.

In FIGS. 5 and 6, A[k] (k being a natural number) shows the $k^{th}$ ATA command received by memory card drive 200 after power ON, DAT[k] shows data transfer synchronized with the $k^{th}$ ATA command, and S[k] shows the SD command issued to the SD card in correspondence with the $k^{th}$ ATA command.

In FIG. 6, level (a) shows the timing of processing in the host device to issue ATA commands, level (b) shows the timing at which interrupts showing completion of data transfer corresponding to ATA commands occur, level (c) shows the timing of processing in memory card drive 200 to issue SD commands, level (d) shows the supply of the clock signal to the SD card, level (e) shows the operation timing of processing in the SD card such as conversion from logical to physical addresses, and level (f) shows the timing at which data is transferred.

Although all four ATA commands A[1] to A[4] request data reading, the data requested by A[1] to A[3] forms a series of moving picture data recorded in a recording area of the SD card having consecutive logical addresses. Thus, with the ATA commands A[2] and A[3], the sector number of the read start sector is consecutive with the sector number of the end sector of reading by the previous ATA command (i.e. A[1] and A[2], respectively). On the other hand, the ATA command A[4] requests reading of data not related to A[1] to A[3], and thus the sector number of the read start sector of A[4] is not consecutive with the sector number of the end sector of reading by A[3].

The series of operations in response to ATA command A[1] issued by the host device are described firstly. A[1] is constituted from a read command, a start address, and the number of sectors to be read. On receipt of A[1], memory card drive 200 analyses A[1] and issues S[1] consisting of a read start command and a start address to the SD card. On receipt of S[1], the SD card executes DAT[I] after performing internal processing (e.g. conversion of logical addresses to physical addresses). Once DAT[I] has started, memory card drive 200 monitors the transferred data amount using clock start/end control unit 10, and once the transferred data amount of DAT[I] reaches the number of sectors to be read obtained from A[1], memory card drive 200 suspends supply of the clock signal to the SD card and asserts an interrupt to the host device. At this time, clock start/end control unit 10 also sums the sector number of the start sector of A[1] and the number of read sectors, and records the result to command storage unit 6. As a result of the above series of sequences, the data reading in response to A[1] in the host device is completed, and the suspended state of the reading operation in the SD card is maintained due to the continued suspension of the clock supply, preventing further reading of data. Synchronization of data transfer between the host device and the SD card is thus preserved.

The host device, having detected the transfer end of DAT [1] in response to A[1] as a result of the interrupt, then issues A[2]. Memory card drive 200, having received A[2], analyzes A[2] in command analysis unit 5 and continuity check unit 8 to check the continuity between A[1] and A[2]. Here, the continuity check confirms that A[2] is a read command and that the start sector number of A[2] is equal to the sum of the start sector number of A[1] and the number of read sectors recorded in command storage unit 6. Memory card drive 200, after confirming the continuity of A[1] and A[2], resumes supply of the clock signal to the SD card using clock start/end control unit 10. Once supply of the clock signal has been resumed, the suspended read operation in the SD card is resumed, resulting in DAT[2] corresponding to A[2] being executed. Once DAT[2] has started, memory card drive 200 monitors the transferred data amount using clock start/end control unit 10, and when the transferred data amount reaches the number of sectors to be read obtained from A[2], memory card drive 200 suspends supply of the clock signal to the SD card and asserts an interrupt to the host device. At this time, clock start/end control unit 10 records the sum of the start address of A[2] and the number of read sectors. As a result of the above series of sequences, data reading in response to A[2] in the host device is completed, and the read operation in the SD card is once again suspended, preventing further reading of data.

The host device, having detected completion of the transfer processing of DAT[2] in response to A[2], then issues A[3], after which sequences similar to those in response to A[2] are processed by the host device, memory card drive 200 and the SD card. As a result, the sum of the start address of A[3] and the number of read sectors is recorded to command storage unit 6, the read operation in the SD card is suspended, and an interrupt in response to A[3] is asserted to the host device.

Having detected completion of DAT[3] in response to A[3] as a result of the interrupt asserted with processing in the above state, the host device then issues A[4]. Memory card drive 200, having received A[4], analyzes A[4] in command analysis unit 5 and continuity check unit 8 to check the continuity between A[3] and A[4]. However, because the start sector number of A[4] is not equal to the sum of the start sector number of A[3] and the number of read sectors recorded in command storage unit 6, the continuity of A[3] and A[4] is not confirmed despite A[4] being a read command. In view of this, memory card drive 200 issues a STOP command to the SD card at the same time as resuming supply of the clock signal. This results in the suspended read operation in the SD card being terminated. Memory card drive 200 then issues S[4] consisting of a read start command and a start address to the SD card. The SD card, having received S[4], executes DAT[4] after performing internal processing such as the conversion of the logical address to a physical address. Once DAT[4] has started, memory card drive 200 monitors the transferred data amount using clock start/end control unit 10, and when the transferred data amount of DAT[4] reaches the number of sectors to be read obtained from A[4], memory card drive 200 suspends supply of the clock signal to the SD card and asserts an interrupt to the host device. At this time, clock start/end control unit 10 also sums the start sector number of A[4] and the number of read sectors, and updates the record in command storage unit 6. As a result of the above series of sequences, the reading in response to A[4] in the host device is completed, and the read operation in the SD card is suspended, preventing further reading of data.

In the present example, the host device does not issue any new ATA commands after A[4]. Memory card drive 200 measures the time lapse from when the clock supply to the SD card is suspended. Since a further ATA command is not received, memory card drive 200 issues a STOP command to the SD card when the predetermined time period elapses, at the same time as resuming supply of the clock signal to the SD card. This result in the suspended read operation in the SD card being terminated. As a result of this sequence, the SD card waits for an SD command while being supplied with the clock signal. This completes description of exemplary operations by memory card drive 200.

In the above example, processing that represents data transfer overheads, such as the issuance of SD commands by memory card drive 200 and the conversion of addresses in an SD card, arises in the series of sequences executed in response to A[1] and A[4]. However, processing that represents these overheads does not arise in the series of sequences executed in response to A[2] and A[3].

Here, the time taken in the series of processing operations from the issuance of A[1] until the assertion of the interrupt corresponding to A[1] is (u+t), where u is the time required for the issuance of SD commands by memory card drive 200 and the conversion of addresses in the SD card, and t is the time required for the data transfer expressed by each of DAT[1] to DAT[4]. In contrast, with A[2] and A[3], the time taken in the series of processing operations from the issuance of the respective commands until the assertion of corresponding interrupts is only t.

Figure 8:
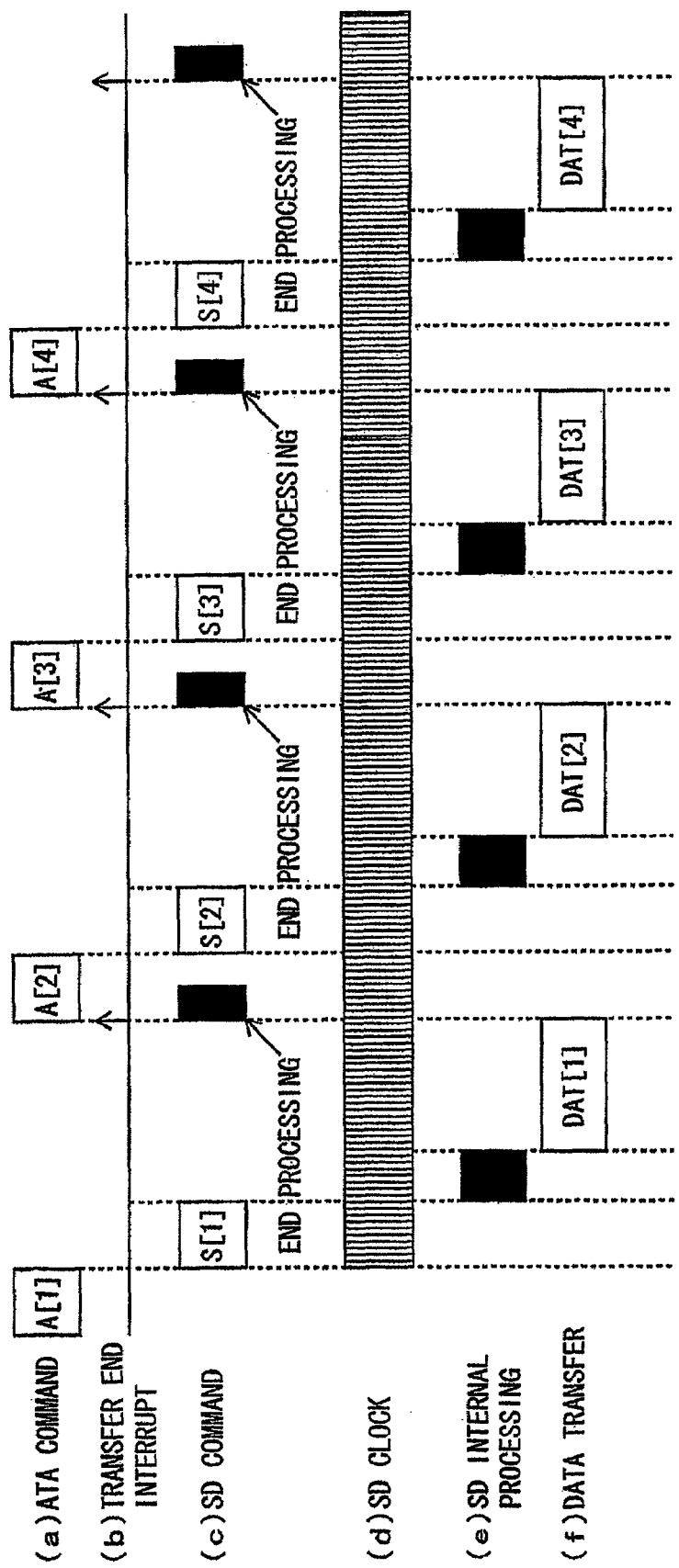
FIG. 8 is a timing chart showing an exemplary operation by a conventional memory card controller.

The series of processing operation corresponding to A[1] and A[3] is thus shortened by 2u in comparison with the conventional operations shown in FIG. 8.

In particular, since the number of sectors read from a single SD card by a single ATA command decreases in inverse proportion to the number of installed SD cards as a result of striping in the case where multiple SD cards are installed as shown in FIG. 1, the time t required for data transfer will also be reduced. The result is a reduction in the difference between u, which takes a constant value regardless of the number of installed SD cards, and t, which decreases in inverse proportion to the number of installed SD cards. Here, taking the number of installed SD cards t=u as an example, a time period of 6u is required to execute the series of processing operations corresponding to A[1]-A[3] according the convention operations shown in FIG. 8, whereas this processing is completed in a time period of 4u according to the present embodiment. Comparing these results in terms of transfer rate gives 6u/4u, which shows that memory card drive 200 pertaining to the present embodiment achieves a 50% improvement in the transfer rate over the prior art.

Greater efficiency in terms of the improvement in transfer rate according to the present embodiment is obtained the larger the number of ATA commands whose read start sector is consecutive with the read end sector of a preceding ATA command, as is the case with A[2] and A[3]. For example, in the case where eight ATA commands have a read start sector that is consecutive with the read end sector of a preceding ATA command, an 78% improvement in the transfer rate is achieved over the prior art when the number of installed SD cards is t=u.

According to the present embodiment as described above, when the size of moving picture data surpasses the 64 Kbytes readable in response to a single ATA command during reading of a series of moving picture data recorded in a recording area of an SD card having consecutive logical addresses, the host device requests reading of moving picture data divided by the plurality of ATA commands. However, in the SD card this is processed as a single continuous read operation due to the memory card controller 2 controlling the clock supply to the SD card.

As a result, it is possible to suppress the adverse affect on the read rate of processing that represents overheads, such as the conversion from ATA commands to SD commands and the conversion from logical addresses to physical addresses, and to thus aim at improving the read rate.

Also, according to the present embodiment, the reading of mass data recorded in a contiguous area is processed by the host device as a plurality of read operations in response to a plurality of ATA commands, whereas the SD card processes this data as a continuous read operation controlled by a pair of transfer start and STOP commands. However, since the read operation in the SD card is suspended during periods in which data transfer cannot be handled by the host device, synchronization of read operations between the host device and the SD card is not lost.

Note that while description in the present embodiment relates to a structure that improves the transfer rate during the read operation by an SD card, the present invention is similarly applicable in relation to controlling the write operation of an SD card.

Figure 7:
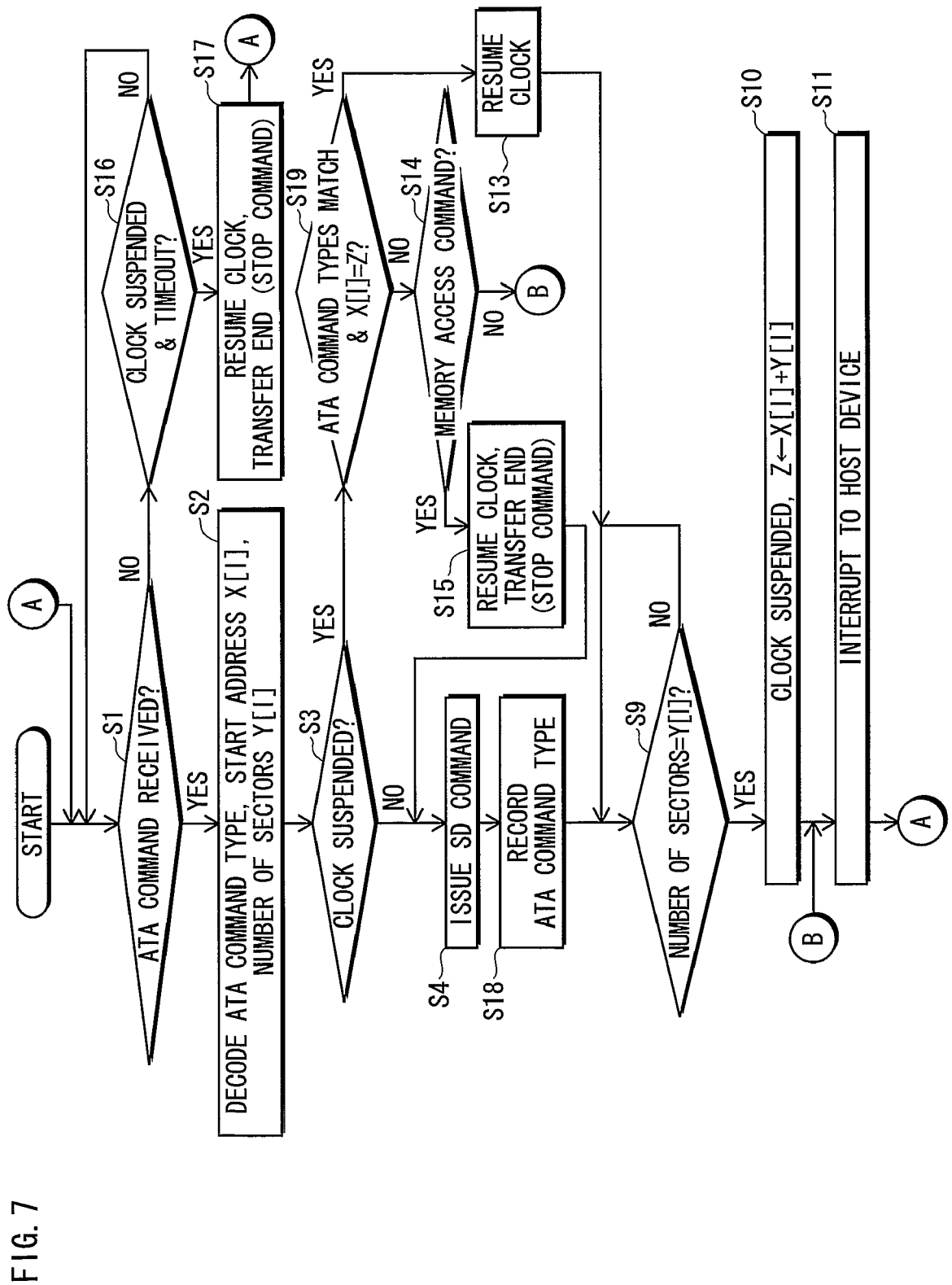
FIG. 7 is a flowchart showing a processing procedure to control data transfer by a memory card controller pertaining to a modification of the present embodiment.

The following describes a modification that improves the transfer rate of both writing and reading. FIG. 7 is a flowchart showing a processing procedure to control data transfer by a memory card controller pertaining to a modification of the present embodiment. In comparison with the flowchart shown in FIG. 4, the flowchart shown in FIG. 7 includes step S18, while the processing procedure of steps S5 to S8 has been removed, and the step S12 judgment has been changed to the judgment of step S19.

Consequently, even if an ATA command received while the clock signal is being supplied to an SD card requests either writing or reading, data transfer is controlled through steps S9 to S11 after firstly recording the type of the ATA command in command storage unit 6 at step S18 as one of a write request or a read request.

When an ATA command is received with the clock supply to the SD card in a suspended state, the conditions for continuity judged at step S19 change to (A) and (B) below, with step S13 being executed if both these conditions are satisfied.

(A) The type of the new ATA command received as part of the current processing matches the type of a previously processed ATA command recorded in command storage unit 6.

(B) The consecutive start address Z recorded to command storage unit 6 when step S10 was executed in processing a previous ATA command matches the logical address X[I] of the transfer destination acquired at step S2 based on the new ATA command received as part of the current processing.

As a result, this modification enables improvements in the transfer rate for both writing and reading, even in the case where either writing or reading is requested, when ATA commands of the same type are continually issued with respect to consecutive sectors.

The present invention, while having been described based on the above embodiment, is of course not limited to the above embodiment. The following cases are also included in the present invention.

(1) The present invention may be the methods shown above. These methods may be computer programs realized by a computer, or digital signals consisting of the computer programs.

The present invention may also be a computer readable recording medium recording the computer programs or digital signals, examples of which include flexible disk, hard disk, CD-ROM, MO, DVD, DVD-ROM, DVD-RAM, BD (Blu-ray Disc), and semi-conductor memory etc. The present may alternatively be the computer programs or digital signals recorded on the recording medium.

The present invention may be a medium that conveys the computer programs or digital signals via a telecommunications circuit, a wireless or cable communications circuit, or a network typified by the Internet.

The present invention may be a computer system provided with a microprocessor and a memory, with the memory storing the computer programs and the microprocessor operating in accordance with the computer programs.

The computer programs or digital signals may be implemented in another independent computer system by being recorded on the recording medium and transferred to the other computer system or by being transferred via the network.

(2) In the above embodiment, a memory card drive device is described that uses SD cards as memory cards. However, the present invention naturally exhibits similar effects to the above embodiment whatever type of memory card is used, provided the memory card requires commands whose specifications are different to those of commands issued by a host device.

(3) In the above embodiment, timeout processing is performed according to which the memory card drive device measures the time lapse from when supply of a clock signal to an SD card is suspended, and has the memory card terminate the data transfer operation once a predetermined time period has elapsed. However, the timeout processing may be executed after a predetermined time period has elapsed from when the last processed ATA command is received.

(4) In the above embodiment, the memory card drive device is connected to a host device via a card bus, although connection to a host device may be via a PCI bus or SCSI etc.

(5) In the above modification of the embodiment, a structure was described in which the memory card drive device also has an SD card suspend the write operation by suspending supply of a clock signal to the SD card. However, the suspension of the write operation is also executable by suspending supply of write data to the SD card.

(6) The present invention may be any combination of the above embodiment and modifications.

INDUSTRIAL APPLICABILITY

The present invention may, for example, be applied in a PC card type memory card drive device that controls data transfer to/from an SD card.

The invention claimed is:

1. A memory card controller for controlling data transfer between a host device that requests data transfer by issuing a command specifying a data amount and a memory card that executes a transfer operation from receipt of a transfer start instruction until receipt of a transfer end instruction, the memory card controller comprising:

a receiving unit operable to sequentially receive commands from the host device;

a suspending unit operable to control the memory card to suspend the transfer operation by suspending supply of a clock signal to the memory card when a data amount transferred as a result of the transfer operation reaches a data amount specified by an $n^{th}$ command that requests the data transfer; and a resuming unit operable to resume supply of the clock signal to the memory card to have the memory card resume the suspended transfer operation if a command received subsequent to the $n^{th}$ command when the transfer operation is in a suspended state requests data transfer with respect to an address consecutive to an end address of the data transfer requested by the $n^{th}$ command.

2. The memory card controller of claim 1, wherein the data transfer is data reading from the memory card, and the transfer operation by the memory card is a data read operation.

3. The memory card controller of claim 2 further comprising an instruction issuing unit operable to control starting and ending of the data read operation by respectively issuing the transfer start instruction and the transfer end instruction to the memory card, wherein if a predetermined time period elapses with the data read operation in the suspended state, said resuming unit has the memory card cancel the suspended state by resuming supply of the clock signal, and said instruction issuing unit has the memory card terminate the data read operation by issuing the transfer end instruction.

4. The memory card controller of claim 2, wherein said suspending unit maintains the suspended state of the data read operation if the subsequent command does not require access to the memory card.

5. The memory card controller of claim 2 further comprising:

an instruction issuing unit operable to control starting and ending of the data read operation by respectively issuing the transfer start instruction and the transfer end instruction to the memory card, wherein if the subsequent command requests one of data writing and data reading to read data from an address that is not consecutive to the end address of the data reading requested by the $n^{th}$ command, said resuming unit has the memory card cancel the suspended state of the data read operation by resuming supply of the clock signal, and said instruction issuing unit issues the transfer start instruction in response to the subsequent command after having the memory card terminate the data read operation by issuing the transfer end instruction.

6. The memory card controller of claim 1, wherein the data transfer is data writing to the memory card, and the transfer operation by the memory card is a data write operation.

7. The memory card controller of claim 6, wherein the suspension and the resumption of the data write operation is controlled by respectively suspending and resuming supply of write data to the memory card.

8. The memory card controller of claim 7 further comprising:

an instruction issuing unit operable to have the memory card terminate the data write operation by issuing the transfer end instruction if a predetermined time period elapses with the data write operation in the suspended state.

9. The memory card controller of claim 7, wherein said suspending unit maintains the suspended state of the data write operation if the subsequent command does not require access to the memory card.

10. The memory card controller of claim 7 further comprising:
an instruction issuing unit operable to issue the transfer start instruction to the memory card in response to the subsequent command after having the memory card terminate the data write operation by issuing the transfer end instruction, if the subsequent command requests one of data reading and data writing to write data to an address that is not consecutive to the end address of the data writing requested by the $n^{th}$ command.

11. A memory card drive device comprising:
a memory card controller as in claim 1;
a first interface operable to be connected to a host device; and
a second interface operable to accept one or more memory cards, wherein
the memory card controller accesses the one or more memory cards installed in said second interface, based on a command inputted from the first interface.

12. A computer-readable recording medium having recorded thereon a computer program for a memory card controller that controls data transfer between a host device which requests data transfer by issuing a command specifying a data amount and a memory card which executes a transfer operation from receipt of a transfer start instruction until receipt of a transfer end instruction, the computer program controlling a processor of the memory card controller to execute the steps of:
controlling the memory card to suspend the transfer operation by suspending supply of a clock signal to the memory card when a data amount transferred as a result of the transfer operation reaches a data amount specified by an $n^{th}$ command that requests the data transfer; and
resuming supply of the clock signal to the memory card to have the memory card resume the suspended transfer operation if a command received subsequent to the $n^{th}$ command when the transfer operation is in a suspended state requests data transfer with respect to an address consecutive to an end address of the data transfer requested by the $n^{th}$ command.

\* \* \* \* \*